United States Patent [19]
Engeler

[11] Patent Number: 6,105,434
[45] Date of Patent: Aug. 22, 2000

[54] ACCELERATION-COMPENSATED PRESSURE TRANSDUCER

[75] Inventor: Paul Engeler, Frauenfeld, Switzerland

[73] Assignee: K.K. Holding AG, Winterthur, Switzerland

[21] Appl. No.: 09/149,074

[22] Filed: Sep. 8, 1998

[30] Foreign Application Priority Data

Sep. 15, 1997 [CH] Switzerland ............................ 2171/97

[51] Int. Cl.[7] ...................................................... G01L 9/08
[52] U.S. Cl. .................................. 73/702; 73/723; 73/753; 310/338
[58] Field of Search ............................ 73/702, 723, 753; 310/338

[56] References Cited

U.S. PATENT DOCUMENTS

| | | |
|---|---|---|
| 3,602,744 | 8/1971 | Hugli . |
| 3,651,353 | 3/1972 | Hugli et al. . |
| 3,672,223 | 6/1972 | Spescha . |
| 3,857,287 | 12/1974 | Sonderegger et al. . |
| 4,061,035 | 12/1977 | Witzke et al. . |
| 4,519,254 | 5/1985 | Sonderegger et al. . |
| 4,559,821 | 12/1985 | Engeler et al. . |
| 4,604,544 | 8/1986 | Konomi et al. . |
| 4,735,091 | 4/1988 | Engeler et al. . |
| 4,982,608 | 1/1991 | Märki et al. . |
| 5,168,192 | 12/1992 | Kosugi et al. ........................... 310/338 |
| 5,513,534 | 5/1996 | Brechbühl et al. . |

FOREIGN PATENT DOCUMENTS 11 94 074  2/1967  United Kingdom .

*Primary Examiner*—Joseph L. Felber
*Attorney, Agent, or Firm*—Barnes & Thornburg

[57] ABSTRACT

The invention is an acceleration-compensated pressure transducer having only one signal crystal array joined by two masses and connecting elements to an inner part having a flange. The installation housing of the pressure transducer is joined to the flange and touches the inner part of the pressure transducer at no other point. Hence, the inner part constitutes a freely vibrating element, which with the masses and the stiffnesses optimized, measures only the pressure signal.

11 Claims, 4 Drawing Sheets

$$\Delta l_1 = \Delta l_2$$
$$\frac{m_1 \times b}{c_1} = \frac{m_2 \times b}{c_2}$$
$$\frac{m_1}{c_1} = \frac{m_2}{c_2}$$

ACCELERATION-COMPENSATED PRESSURE TRANSDUCER

BACKGROUND AND SUMMARY OF THE INVENTION

The invention concerns an acceleration-compensated pressure transducer.

For measuring dynamic pressure phenomena in gaseous or liquid media, especially in engines and turbo systems, there is a need for pressure transducers that can be mounted directly in the vibrating housing walls of such machines without the acceleration forces of these interfering with the pressure signal being measured. Usually piezoelectric pressure transducers are used for such measurements, especially where highly dynamic processes or measurements in temperature ranges above 200° C. are involved.

In some applications, it is enough to fit the pressure transducers into the vibrating machine walls by elastically supported adapters. In higher temperature ranges, this is not generally possible. Thus, for years, piezoelectric acceleration elements have been integrated in the pressure transducers to detect the acceleration forces separately. This entails much technical outlay, because an additional piezo-element, mostly in the form of one or more crystal plates, has to be fitted counterconnected to the pressure signal crystal array. This reduces the useful pressure signal by at least ⅓ of the maximum value. This is a further great disadvantage because in many cases amplitudes of a few millibars must be measured. Moreover, it has been shown that the acceleration compensation obtainable by the familiar countermeasures may be influenced very considerably by socket or metal cable connections, i.e. if additional masses are connected to the pressure transducer housing.

It is the purpose of the invention to simplify technically pressure transducers of the known kind and exclude the influences of the various connection methods. This is achieved by dividing the pressure transducer into a measuring inner part and a housing-like outer part and joining the two together only at the diaphragm flange part, a freely vibrating measuring system is obtained, which regardless of its housing measures, vibrates and compensates accelerations and vibrations.

DETAILED DESCRIPTION OF THE PREFERRED EMBODIMENTS

Figure 1:
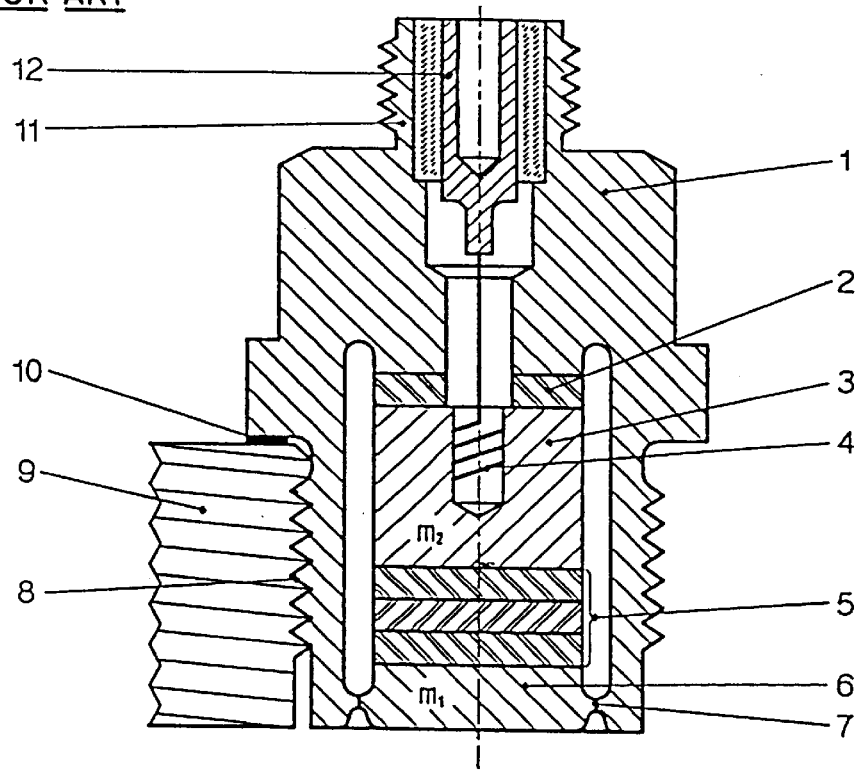
FIG. 1: Schematic cross section of a prior art piezoelectric pressure transducer with two crystal arrays counterconnected.
Figure 2:
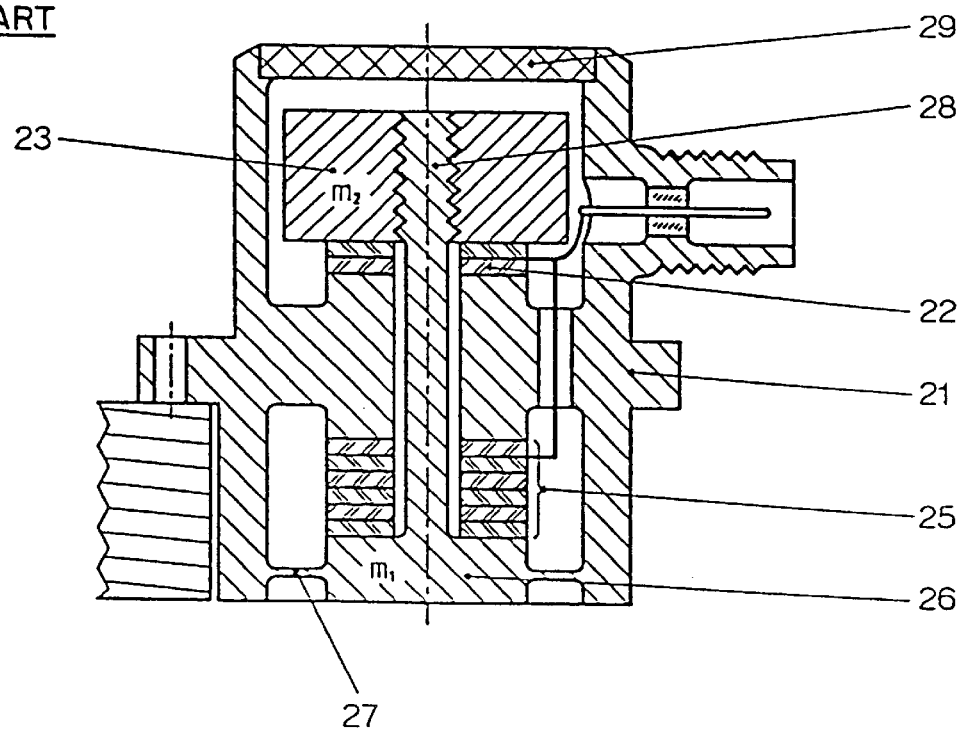
FIG. 2: Prior art piezoelectric pressure transducer with two crystal arrays likewise counterconnected and machinable mass m2.

FIGS. 1 and 2 show piezoelectric pressure transducers as made in thousands during the last 20 years and still being fitted.

FIG. 1 shows the cross section through an acceleration-compensated pressure transducer of the simpler kind, with the transducer housing 1. The compensating crystal array 2 is shown in the form of a piezo-plate. The compensating mass 3 takes the form of an electrode and encloses the contact spring 4. The measuring crystal 5 is in the form of three piezo-plates, corresponding to a known commercial pattern.

The diaphragm bottom mass 6 is the mass m1, while 3 is the mass m2. These two masses are dimensioned so that an optimal acceleration compensation is obtained. The diaphragm 7 joins the pressure transducer housing 1 with its thread 8 to the mass 6. Usually the housing 1 is sealed against the machine wall 9 by the sealing ring 10. A socket thread 11 receives a cable connector; 12 is a contact sleeve for the connector.

FIG. 2 shows a piezoelectric transducer of more complicated form, as is used generally in turbines. The compensating mass 23 is joined by the screw 28 to the diaphragm bottom mass 26, which is joined to the housing 21 through the diaphragm 27. The measuring crystal array 25 consists of several piezo-disks whose signals are taken off at the side by metal electrodes. The counterconnected compensating crystal array 22 is shown as two piezo-plates with an electrode between them leading the signal to the connector. After opening the cover 29, the compensating mass 23 can be adapted in the finally assembled state, which is an advantage over FIG. 1.

Figure 3:
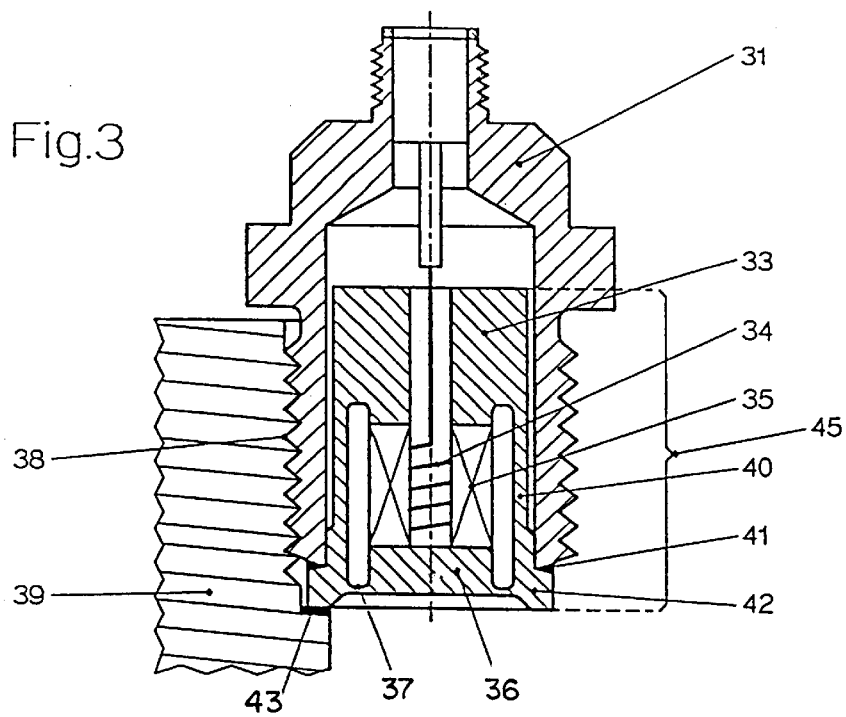
FIG. 3: Schematic section of a piezoelectric pressure transducer according to the invention.
Figure 6:
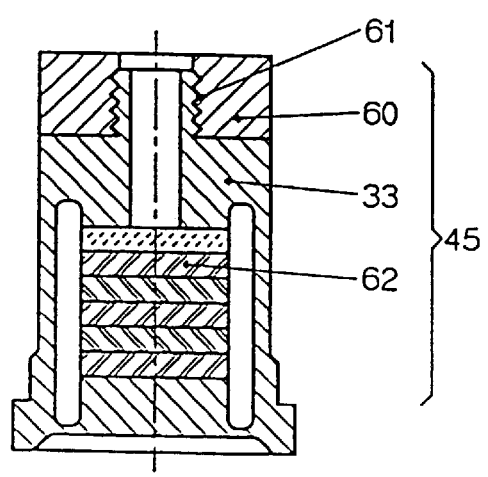
FIG. 6: A variant of the inner part of the pressure transducer with screw-on heavy metal mass, in schematic section.

FIG. 3 shows schematically a pressure transducer according to the invention with dynamic compensation, without additional crystal array connected. The outer housing part 31 surrounds the inner part 45, which consists of the overlaid compensating mass 33, the measuring crystal array 35 and the diaphragm bottom mass 36 joined to the flange 42 through the diaphragm 37. The inner wall sleeve 40, which may also be replaced by individual slats joins the compensating mass 33 to the flange 42. This creates a closed unit, in which the enclosed crystal array 35 is under mechanical preload. The inner part 45 is inserted into the housing outer part 31 after coarse or fine compensation of the acceleration sensitivity and joined to the outer housing part 31 through the flange 42 by the weld 41. The diaphragm part 37 is thus joined rigidly to the housing outer part 31 and through the assembling thread 38 on the outer housing part 31 to the machine wall 39 at the installation point. The measuring system accommodated in the inner part 45 is able to vibrate freely axially, as it does not touch the housing wall 31 anywhere. Here the measuring crystal array 35 consists of transverse-cut crystal elements, in the middle of which the contact spring 34 leads off elastically the signal to the connector. As shown in FIG. 6, a crystal array 62 consisting of longitudinally cut or ceramic piezo-plates may be used also.

Diaphragm 37 and inner wall sleeve 40 are connecting elements acting as spring elements of defined stiffness between the masses 36(m1) and 33(m2) and the flange 42. Their stiffnesses c1 and c2 may be adapted by removing material if necessary, in order to compensate acceleration and vibration forces in conjunction with a matching of the masses m1 and m2, as described below. Since, however, any modification of the diaphragm 37 is relatively difficult, and it must also possess a certain minimum stiffness too, it is advisable to remove any material from the inner wall sleeve 40 to match the stiffnesses.

Figure 4:
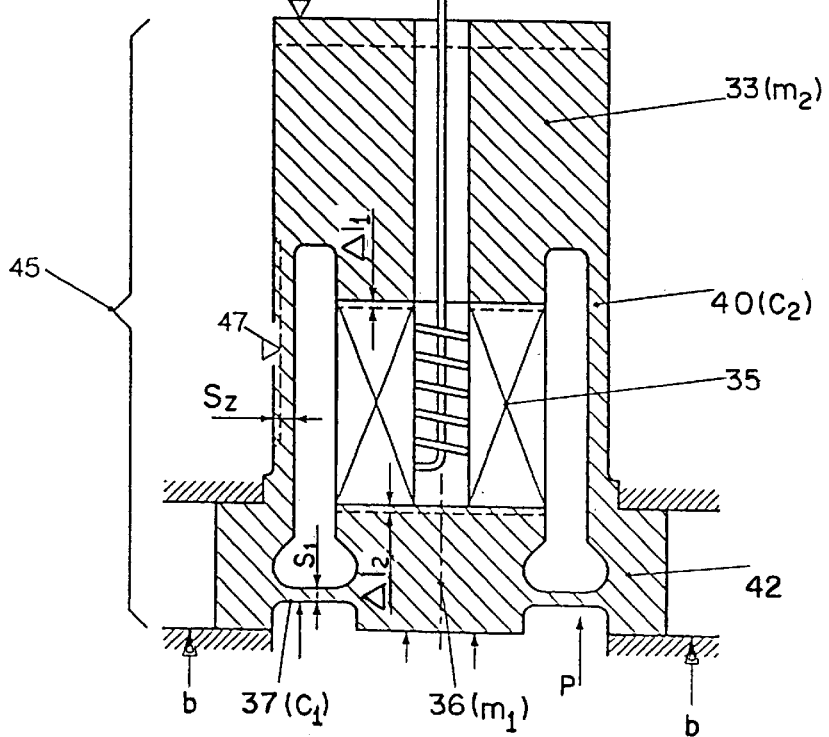
FIG. 4: Schematic section through the inner part of a pressure transducer according to the invention (FIG. 3).

FIG. 4 shows the basic concept of the new dynamically compensated measuring part according to the invention. The inner part 45 hangs free where the flange 42 is fixed, at which the measuring system is secured on the shaker as indicated. When an acceleration b acts from below on the flange 42, the flange 42 moves up a certain distance per unit time. On account of their inertia and the "springing" of elements 37 and 40, the masses 36 and 33 each sustain a downward microdisplacement $\Delta l_1$ and $\Delta l_2$ respectively in relation to flange 42 and the housing outer part 31 joined to it. If now the values of m1,m2,c1,c2 are matched according to the invention so that $\Delta l_1 = \Delta l_2$ (FIG. 4), then the acceleration b produces no measuring signal in the crystal array, because this is not loaded. On the other hand a medium pressure p on the diaphragm bottom mass 36 and diaphragm 37 induces an upward displacement, which however is practically not transmitted through the inner wall sleeve 40 but stored in the flange 42. Through the non-movement of the overlaid compensating mass 33 a measuring signal results from compression of the crystal array 35.

By appropriate matching of the stiffnesses c1 and c2 of diaphragm 37 and sleeve 40 and/or the masses 33 and 36, over a selected frequency range an acceleration compensation is obtained without an additional separate crystal array. The selected frequency range is suitably defined so that it largely covers the measuring range of the pressure transducer. A significantly simpler construction is made possible by this, constituting an economic step forward. In particular, however, any influence by extraneous forces on the connector and housing is minimized.

It should further be mentioned that the reason for the minimum stiffness c1 of the diaphragm 37 is that the size of the overlaid compensating mass 33 is subject to a limit, which must be in a certain relation to the mass 36 (m1) and the stiffnesses c1 and c2 as was shown in FIG. 4. Also the stiffness c2 of the inner wall sleeve 40 should be as large as possible in view of the relation shown in FIG. 4, in order to suppress as much as possible any transmission of a medium pressure loading on the mass 33 to be measured. In this way, the sensitivity of the pressure transducer according to the invention can be optimized.

Figure 5:
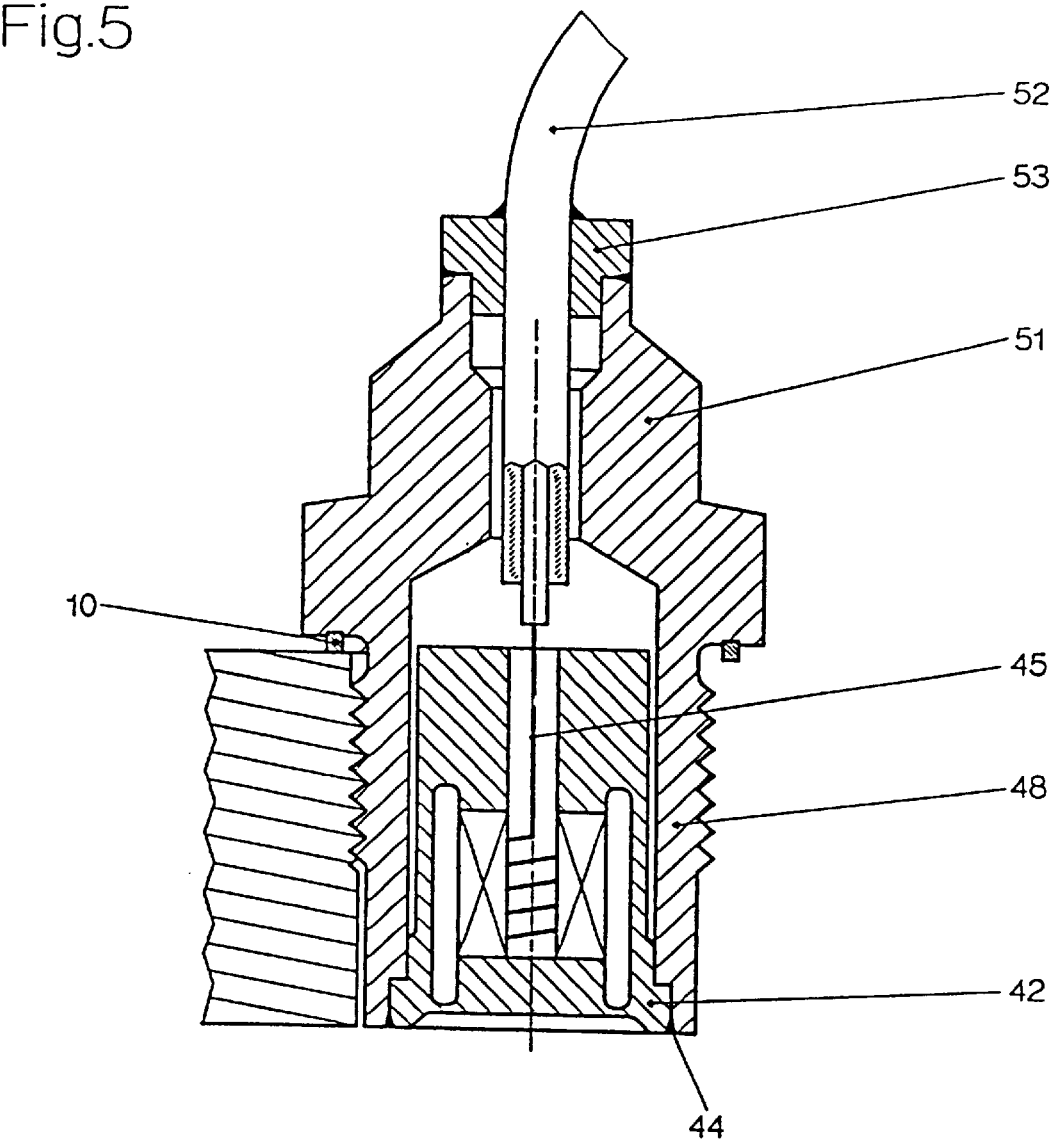
FIG. 5: Schematic section through piezoelectric pressure transducer according to the invention, with metal cable connection and a variant in the flange welding.

FIG. 5 shows another pressure transducer 51 with embodiment variants according to the invention. Instead of a connector there is a metal cable 52 integrated with the pressure transducer 51 through a welding flange 53. Instead of the front seal 43 in FIG. 3, there is a seal 10 underneath the hexagon, which is followed by a solid threaded part 48. The inner part 45 with the flange 42 is joined frontally to the threaded part 48 by the weld 44. This design is preferred for low-pressure applications.

FIG. 6 shows an alternative inner part 45. To save space, an additional mass 60 is placed on the overlaid compensating mass 33, e.g. with a thread 61, in case the material is not weldable, like a tungsten-based heavy metal for example. Instead of the transverse crystal array 35, a plate crystal array 62 is shown, consisting of ceramic piezo-plates or monocrystal plates. Consequently the signal must be taken from the topmost plate.

Figure 7:
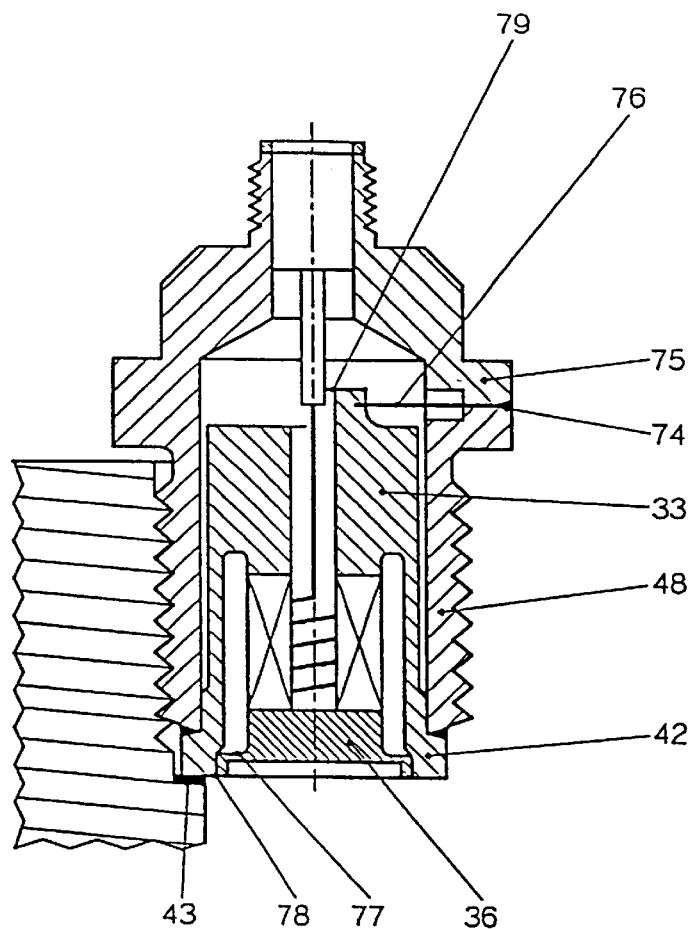
FIG. 7: Piezoelectric pressure transducer according to the invention, with alternative diaphragm welding and lateral bracing of the inner part.

FIG. 7 shows further embodiments according to the invention. The diaphragm 77 is joined to the flange 42 by frontal weld 78. In installations where high lateral accelerations are sustained, lateral deflection of the compensating mass 33 is made difficult by a transverse bracing diaphragm 76 shown on the right, which is held in the parting 75 by a weld 74.

Figure 8:
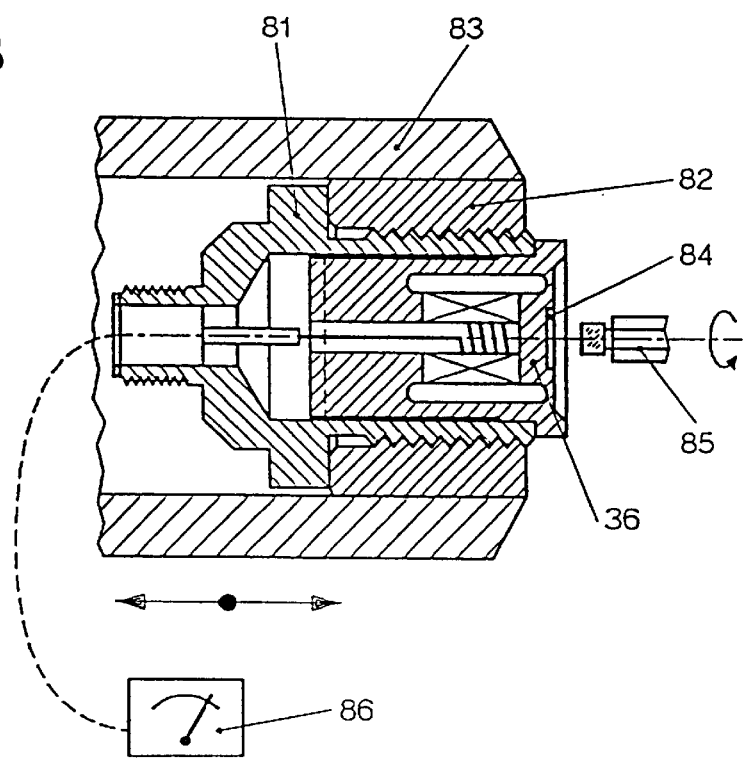
FIG. 8: Piezoelectric pressure transducer according to the invention, mounted on a shaker, with direct display of the fine compensation.

FIG. 8 shows the procedure for fine adjustment prior to the acceptance test. The pressure transducer is connected with a lead to the compensation indicator 86 and mounted with its housing outer part 81 in the holding sleeve 83 of the shaker by the threaded sleeve 82. Material is removed in steps by milling or grinding tool 85 from the fine compensation recess 84 in the diaphragm bottom mass 36 till the instrument 86 shows the optimal value with the shaker switched on. In this way all pressure transducers of a series can be adjusted to specified acceleration compensation values.

The invention thus makes possible a significant advance through a substantial design simplification and complete independence of the degree of compensation on outside influences affecting the pressure transducer housing, such as different cable lengths which may cause self-oscillation.

Although the present invention has been described and illustrated in detail, it is to be clearly understood that the same is by way of illustration and example only, and is not to be taken by way of limitation. The spiring and scope of the present invention are to be limited only by the terms of the appended claims.

I claim:

1. An acceleration-compensated pressure transducer comprising:
    a pressure measuring element fitted under preload between two masses;
    an inner part joined to a housing-like outer part primarily at a fitting end via a flange;
    the masses being joined to the inner part at the flange by connecting elements with matched stiffnesses; and
    the masses and/or stiffnesses being matched by removing or building-up material so that acceleration or vibration influences give rise to a minimal spurious signal at the measuring element.

2. A pressure transducer according to claim 1, wherein the flange acts as a sealing flange when fitting into the wall of a machine.

3. A pressure transducer according to claim 1 wherein the flange is fitted frontally into a threaded part of the outer part.

4. A pressure transducer according to claim 1, wherein one of the connecting elements consists of a closed tube or slats arranged cagewise, and another connecting element is a diaphragm having a predetermined minimal stiffness.

5. A pressure transducer according to claim 4, wherein the diaphragm is fitted in one piece with a bottom mass frontally into the flange.

6. A pressure transducer according to claim 1, wherein the pressure measuring element is a crystal array of piezoelectric ceramic or piezoelectric monocrystals fitted under preload.

7. A pressure transducer according to claim 6, wherein the pressure measuring element operates up into the region of 800° C.

8. A pressure transducer according to claim 1, wherein the pressure measuring element operates on the piezoresistive, capacitive or optical principle.

9. A pressure transducer according to claim 1, wherein the inner part is joined additionally to the outer part through a transverse stabilizing diaphragm.

10. A method for coarse or fine adjustment of acceleration compensation of a pressure transducer, comprising:

holding a part, having a pressure measuring element between two masses which are connected to a flange of the part by connecting elements having stiffness, on a shaker by the flange; and altering at least one of the determinant parameters of mass and stiffness according to the measuring result.

11. A method for fine adjustment of acceleration compensation of a pressure transducer, comprising;

altering one of the parameters of mass or stiffness on a finally assembled pressure transducer which includes a pressure measuring element between two masses which are connected to the transducer by connecting elements having stiffness, by removing or adding material, so that a acceleration and vibration produce minimal spurious signals at the measuring element.

* * * * *